No. 742,694. PATENTED OCT. 27, 1903.
T. MANNERS.
HARNESS.
APPLICATION FILED MAY 29, 1901.
NO MODEL. 3 SHEETS—SHEET 1.
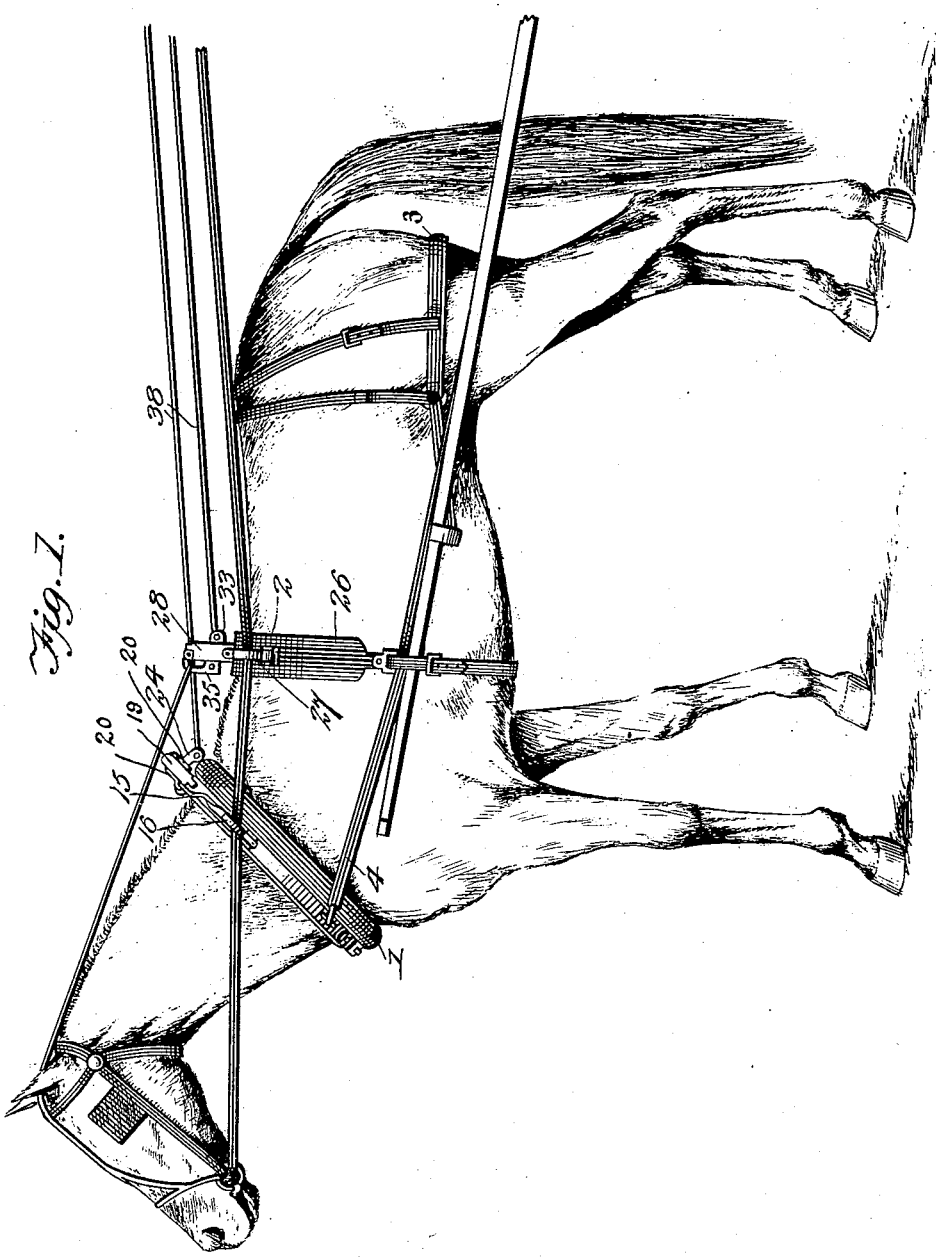
Witnesses:
Edwin H. McKee
Harry S. Robins
Inventor
Thomas Manners
By Victor J. Evans
Attorney
THE NORRIS PETERS CO., PHOTO-LITHO., WASHINGTON, D. C.

No. 742,694. PATENTED OCT. 27, 1903.
T. MANNERS.
HARNESS.
APPLICATION FILED MAY 29, 1901.
NO MODEL. 3 SHEETS—SHEET 2.
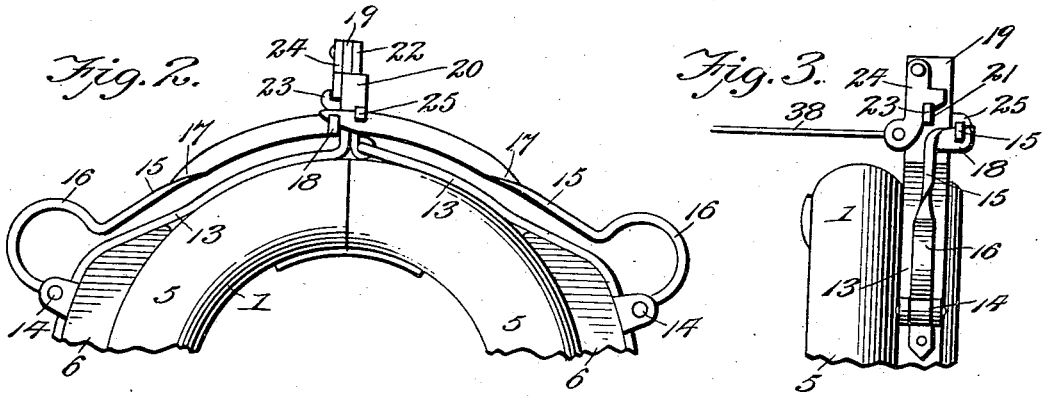
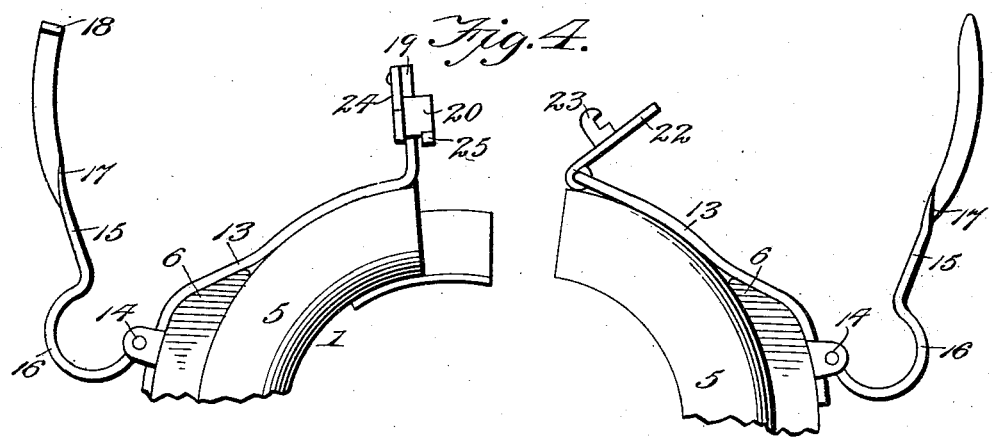
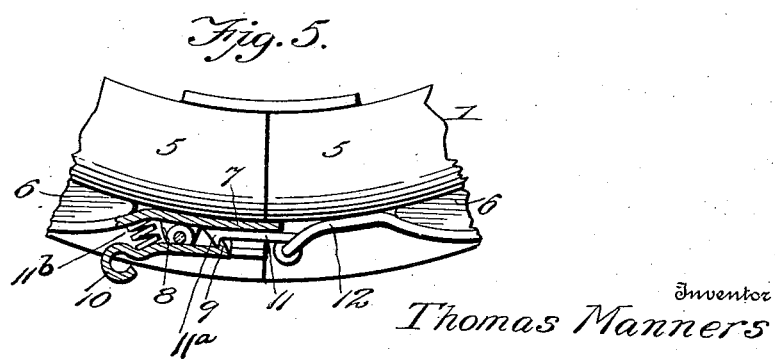
Witnesses
Edwin F. McKee
Harry S. Rohner
Inventor
Thomas Manners
By Victor J. Evans.
Attorney No. 742,694. PATENTED OCT. 27, 1903.
T. MANNERS.
HARNESS.
APPLICATION FILED MAY 29, 1901.
NO MODEL. 3 SHEETS—SHEET 3.
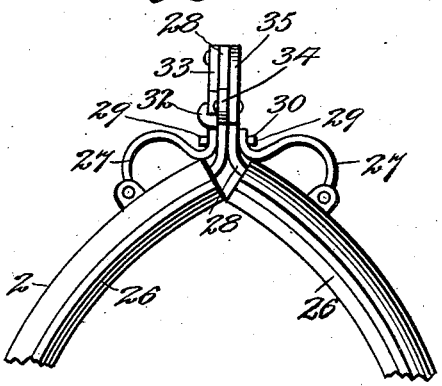
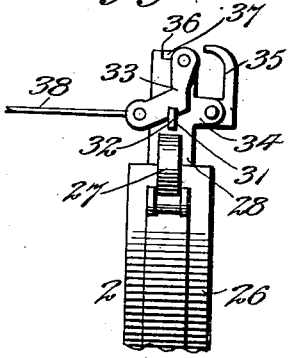
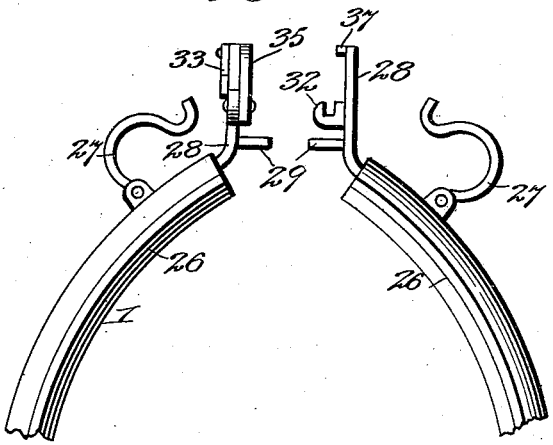
Witnesses
Inventor
Thomas Manners
By Victor J. Evans
Attorney No. 742,694.

Patented October 27, 1903.

UNITED STATES PATENT OFFICE.

THOMAS MANNERS, OF SUNNYLANE, KENTUCKY.

HARNESS.

SPECIFICATION forming part of Letters Patent No. 742,694, dated October 27, 1903.

Application filed May 29, 1901. Serial No. 62,423. (No model.)

*To all whom it may concern:*

Be it known that I, THOMAS MANNERS, a citizen of the United States, residing at Sunnylane, in the county of Butler and State of Kentucky, have invented new and useful Improvements in Harness, of which the following is a specification.

This invention relates to improvements in harness.

The object of the present invention is the provision of a set of harness which is so constructed as to be readily separable, whereby in the event of the horse to which the same is applied becoming frightened the harness may be readily detached and liability to accident arising from runaways reduced to the minimum.

A further object of the invention is the provision of simple and efficient means for effecting the above purpose by the driver of the horse without the necessity of descending from the vehicle to which the horse is attached.

With these general objects in view and others which will appear as the nature of the improvements is better understood the invention consists, substantially, in the novel construction, combination, and arrangement of parts, as will be hereinafter fully described, illustrated in the accompanying drawings, and pointed out in the appended claims.

In the drawings, Figure 1 is a side elevation of a set of harness constructed in accordance with the present invention and illustrated in applied position. Fig. 2 is a fragmentary view of the sectional collar employed in connection with the herein-described harness and illustrating the same in closed position. Fig. 3 is a side elevation of the latch mechanism applied to the collar, said mechanism being closed. Fig. 4 is a fragmentary view illustrating the collar separated. Fig. 5 is a similar view of the lower end of the collar, the coupling applied thereto being in section. Fig. 6 is a front elevation of the harness-saddle. Fig. 7 is a side elevation thereof. Fig. 8 is a front elevation of the harness-saddle, illustrating the same in open position.

Referring to the drawings, the numeral 1 designates the harness-collar; 2, the saddle; 3, the breeching, and 4 the traces. These parts are related in the usual manner; but the gist of the present invention resides in the peculiar construction of the collar and saddle and the couplings therefor.

The collar 1 comprises a pair of complementary sections 5, and to said sections the hames 6 are fixedly connected. Arranged at the lower end of one of the sections 5 is a guide-socket 7, and pivotally mounted within said guide-socket is a spring-pressed pawl 8, said pawl being provided at one of its ends with a catch 9 and at its other end with a loop 10, by which the pawl may be readily operated. The other section 5 is likewise provided at its lower end with a latch 11, provided with a catch 11ª, said latch being hingedly connected to a fastening-strip 12, which strip is connected to the lower end of the hame carried by said collar-section. The guide-socket 7 is likewise fixedly connected to the lower end of the hame carried by the other collar-section, and it will thus be seen that when the latch 11 is inserted into the guide-socket 7 and its catch engaged with the catch of the pawl 8 the collar-sections are adapted to swing upon the pivot-point of the latch in order to permit the upper ends of said sections being separated to enable the collar to be applied. This swinging or hinge movement of the lower portions of the collar-sections is permitted to take place in view of the fact that the pawl 8 will move downwardly or yield to the pressure exerted thereon by the latch 11, the latter meeting with a resistance when in engagement with the upper portion of the guide-socket 7, and the pressure is then transferred to the pawl, which being pivoted and having a spring 11ᵇ interposed between the outer end thereof and the upper adjacent part of the socket 7 will give way sufficiently to effect the hinge action desired without too loose or slack movement.

As above stated, the hames 6 are fixedly connected to the collar-sections 5; but in order to detachably connect the upper ends of said sections, but permit the same being separated in cases of emergency, the following mechanism is employed: A fastening-strip 13 is arranged upon the upper end of each of the hames 6, and each of said strips is provided with a pair of parallel spaced lugs 14, between which lugs the lower ends of a pair of rein-guides 15 are pivoted. The rein-guides 15 are provided with enlarged eyes 16, which eyes receive the reins, while the body portions of said guides are extended and curved, as at 17. The upper end of one of the guides 15 is provided with a forwardly-extending hook 18, and into said hook the extremity of the other rein-guide is adapted to fit when the collar is closed. One of the fastening-strips 13 has its upper end bent at substantially right angles to its body portion to form a coupling eye-plate 19, and said coupling eye-plate is provided at its front and rear edges with a pair of parallel guide-lugs 20, the body portion of the eye-plate 19 being provided with an elongated eye 21. The other fastening-strip 13 is provided at its upper end with a hinged hook-plate 22, and said hook-plate 22 has at its inner face an outwardly-extending hook 23, said hook passing normally through and projecting beyond the eye 21 and in position to be engaged by a vertically-disposed latch 24, pivotally connected to the outer side of the eye-plate 19 and working over the eye thereof. The forward guide-lug 20 has at its lower end a forwardly-extending hook 25, and when the hook-plate 22 is closed between the guide-lugs 20 and the latch 24 engages the hook 23 the hook 25 is adapted to receive the rein-guide 15, which engages with the forwardly-extending hook 18 of the other rein-guide. It will thus be seen that the rein-guides are interlocked and are thereby prevented from separating until the latch 24 has been released from the hook 23, whereupon the hook-plate 22 recedes from the guides 20, and with such movement of the hook-plate it is obvious that the sections of the collar also become separated.

The harness-saddle 2 comprises a pair of sections 26, to each of which sections is pivotally connected a rein-guide 27, the upper ends of said guides being curved upwardly, and arranged at the upper end of each of said sections is an upwardly-extending coupling-plate 28. Each of said plates is provided with an inwardly-extending pin 29, said pins passing through perforations 30 formed in the opposite plate, and said pins project a sufficient distance beyond the outer sides of the plates 28 to enter the curved ends of the rein-guides 27. By reason of this construction it will be seen that when the sections of the saddle are locked together the rein-guides 27 are also maintained in locked relation to the coupling-plates 28, so that separation by outward movement of said guides is prevented. One of the plates 28 is provided with an elongated eye 31, which eye receives an inwardly-extending hook 32, formed at the inner side of the opposite hook-plate 28, and said hook is of sufficient length to project at the exterior of the eye-plate 28 and occupy a position to be engaged by a latch 33, pivotally connected to the exterior of said eye-plate and working over the eye thereof. The eye-plate 28 is also provided with a forwardly-extending lug 34, to which lug is pivotally connected a check-hook 35, and it will be observed that said check-hook is approximately of the same thickness as the plate 28, carrying the hook 32, so that when said plate is immediately in rear of the check-hook 35, as when the sections of the saddle are locked together, the check-hook 35 contacts with said plate, and said check-hook is thereby maintained in upright position. When, however, the coupling-plates 28 are separated, it is obvious that the check-hook 35 is immediately capable of turning upon its pivot, and the forward pressure exerted thereon by reason of the check-rein causes the same to move downwardly. The upper end of the eye-plate 28 is provided with a notch 36, which notch receives a horizontally-disposed inwardly-projecting stud 37, carried by the plate 28, which is provided with the hook 32.

For operating the latches 24 and 33 a pair of cords 38 are employed, said cords being connected to said latches and extending to the driver of the vehicle, so as to be operated in case of emergency.

With the parts assembled as shown in Figs. 1, 2, 3, 6, and 7 it will be seen that the collar 1 and saddle 2 are locked, and it is this position which said collar and saddle occupy when applied to the horse. Should it be desired to quickly detach the horse, it is obvious that when a pull is applied upon the cords 38 the latches 24 and 33 will be moved in a rearward direction, whereupon the latches recede from the hooks 23 and 32, and said hooks being freed from the locking means, which maintain the same in engagement with the respective coupling 19 and coupling-plate 28, the sections of both the collar and saddle immediately separate. With the separation of the coupling-plates 28 the check-hook 35 releases the checkrein, and the horse being freed at once leaves the harness, so that liability to accident arising from runaways is effectually overcome, the harness remaining with the vehicle. When, however, it is desired to apply the harness, the collar 1 and the saddle 2 are placed in their respective positions, the rein-guides 15 and 27, respectively, of the collar and saddle are closed, and the latches 24 and 33 are caused to engage their respective hooks 23 and 32, thereby locking the guides together, as well as securing the collar and saddle closed. The harness is thus reliably held applied until the latches 24 and 33 are again released.

While the form of the invention herein shown and described is what is believed to be a preferable embodiment thereof, it is obvious that the same is susceptible of various changes in the form, proportion, and minor details of construction, and the right is therefore reserved to modify or vary the invention as falls within the spirit and scope thereof.

Having thus fully described the invention, what is claimed as new is—

1. The combination of a sectional collar having a pivotal connection at its lower part, and an interlocking coupling at its upper part, a sectional saddle having a coupling at its upper part and means for locking and unlocking the couplings.

2. In a set of harness, the combination with a sectional collar, rein-guides carried by the sections thereof, and means for locking the sections of said collar together, said locking means operating with the rein-guides for maintaining the latter in locked relation, of a sectional saddle, rein-guides carried by the sections of said saddle, and means for locking the sections of said saddle together, said locking means coöperating with the rein-guides of the saddle for maintaining the latter in locked relation, and means for operating the locking means of the collar and saddle to effect separation of the sections thereof.

3. In a set of harness, the combination with a sectional collar, rein-guides hingedly connected thereto, and latch mechanism for locking the sections of said collar together, said latch mechanism coöperating with the rein-guides to maintain the latter in locked relation, of a sectional saddle, rein-guides carried by the sections of said saddle and hingedly connected therewith, and latch mechanism for interlocking the sections of the saddle, said latch mechanism coöperating with the rein-guides to maintain the latter in locked relation, and means for operating the latch mechanisms of the collar and saddle to effect separation of the sections thereof.

4. A detachable coupling for a part of harness comprising a rein-guide having a hook, another rein-guide engaging the hook, an eye-plate having a guide-plate provided with a hook engaging a rein-guide, a latch pivoted to the eye-plate and working across the eye, and a hook-plate having a hook insertible in the eye so as to be engaged by the latch on the eye-plate, whereby the plates and rein-guides are locked together.

5. In a set of harness, a sectional collar, rein-guides hingedly connected to the sections of said collar and provided with elongated shanks, a slotted flange carried by one of the sections of the collar, a latch-plate carried by the other section and provided with a hook engaging the slot of said flange, and a latch carried by said flange and adapted to engage said hook for locking the latch-plate in engagement with said flange, whereby the sections of the collar are maintained in locked relation, the shanks of the rein-guides being interlocked and held in engagement with each other when the sections are locked together.

6. In a set of harness, a sectional saddle, locking-plates carried by said sections, one of said plates being slotted, and the other provided with a hook engaging said slot, a latch carried by said slotted plate and adapted to engage said hook for locking said plates together, a check-hook carried by said slotted plate, rein-guides carried by the sections of said collar, and means for locking the rein-guides upon the coupling-plates.

In testimony whereof I affix my signature in presence of two witnesses.

THOMAS MANNERS.

Witnesses:
 O. B. ROGLAND,
 S. E. GITHENS.